US 9,964,166 B2

United States Patent
Staahl et al.

(10) Patent No.: US 9,964,166 B2
(45) Date of Patent: May 8, 2018

(54) METHOD FOR DETERMINING AN AIR GAP OF A VEHICLE BRAKE AND VEHICLE BRAKE HAVING A DEVICE FOR DETERMINING AN AIR GAP

(71) Applicant: KNORR-BREMSE Systeme fuer Nutzfahrzeuge GmbH, Munich (DE)

(72) Inventors: Christian Staahl, Munich (DE); Thomas Kliegl, Waiblingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 135 days.

(21) Appl. No.: 14/993,147

(22) Filed: Jan. 12, 2016

(65) Prior Publication Data

US 2016/0123421 A1 May 5, 2016

Related U.S. Application Data

(63) Continuation of application No. PCT/EP2014/064499, filed on Jul. 8, 2014.

(30) Foreign Application Priority Data

Jul. 12, 2013 (DE) .......................... 10 2013 012 104

(51) Int. Cl.
*F16D 66/02* (2006.01)
*F16D 65/56* (2006.01)
(Continued)

(52) U.S. Cl.
CPC .......... *F16D 65/568* (2013.01); *B60T 17/221* (2013.01); *F16D 55/225* (2013.01); *F16D 55/2255* (2013.01); *F16D 2066/006* (2013.01)

(58) Field of Classification Search
CPC ...... F16D 55/24; F16D 55/36; F16D 65/0006; F16D 65/186; F16D 65/0408;
(Continued)

(56) References Cited

U.S. PATENT DOCUMENTS 5,692,586 A * 12/1997 Akamatsu ............... B61H 15/00
188/196 V
6,848,756 B2 * 2/2005 Maron .................. B60T 13/741
303/155
(Continued)

FOREIGN PATENT DOCUMENTS

DE 33 00 446 C2 7/1991
DE 197 51 445 A1 5/1999
(Continued)

OTHER PUBLICATIONS

International Search Report (PCT/ISA/210) issued in PCT Application No. PCT/EP2014/064499 dated Oct. 23, 2014 with English translation (Four (4) pages).
(Continued)

*Primary Examiner* — Thomas W Irvin
(74) *Attorney, Agent, or Firm* — Crowell & Moring LLP (57) ABSTRACT

A method is provided for determining an air gap of a vehicle brake, in particular for a motor vehicle, wherein the vehicle brake includes a clamping device, a wear adjustment device, a sensor apparatus for detecting an actuation stroke of the clamping device, and a vehicle control system. The method performs the following steps: (S1) receiving a measurement signal of the actuation stroke, which measurement signal is provided by the sensor apparatus, within a previously specifiable time window during a braking process and storing the measurement signal as data pairs of actuation stroke and time during a braking process; (S2) calculating a time derivative of the measurement signal in the time window by a suitable algorithm in order to determine a point in time at a maximum; and (S3) determining the air gap on the basis of the point in time thus determined and forwarding the value of the air gap thus determined to the vehicle control
(Continued)

system. A vehicle brake is equipped with a device for determining an air gap for performing the method.

16 Claims, 6 Drawing Sheets

(51) Int. Cl.
*F16D 55/2255* (2006.01)
*B60T 17/22* (2006.01)
*F16D 55/225* (2006.01)
*F16D 66/00* (2006.01)

(58) Field of Classification Search
CPC .. F16D 66/02; F16D 66/021; F16D 2066/003; F16D 66/023; B60T 17/221
USPC ........................................... 188/1.11 L
See application file for complete search history.

(56) References Cited

U.S. PATENT DOCUMENTS

| | | | |
|---|---|---|---|
| 7,175,006 B2 * | 2/2007 | Plantan | F16D 65/183 188/1.11 W |
| 7,322,447 B2 * | 1/2008 | Deckhut | F16D 65/18 188/1.11 L |
| 7,926,626 B2 | 4/2011 | Iraschko | |
| 8,752,422 B2 | 6/2014 | Helf | |
| 9,145,936 B2 * | 9/2015 | Olkkonen | B66D 5/30 |
| 9,279,468 B1 * | 3/2016 | Philpott | F16D 66/021 |
| 9,618,067 B2 * | 4/2017 | Philpott | F16D 65/66 |
| 9,803,712 B2 * | 10/2017 | Jantunen | G01L 5/28 |
| 2003/0150677 A1 | 8/2003 | Maron et al. | |
| 2009/0281702 A1 | 11/2009 | Cahill | |
| 2010/0168979 A1 | 7/2010 | Baier-Welt et al. | |
| 2016/0160949 A1 * | 6/2016 | Philpott | F16D 65/66 188/71.9 |
| 2016/0258501 A1 * | 9/2016 | Staahl | F16D 55/2255 |

FOREIGN PATENT DOCUMENTS

| | | |
|---|---|---|
| DE | 10 2004 037 771 A1 | 3/2006 |
| DE | 10 2005 051 146 B4 | 1/2008 |
| DE | 10 2007 004 604 A1 | 7/2008 |
| DE | 10 2010 032 515 A1 | 2/2012 |
| EP | 2 520 817 A1 | 11/2012 |
| WO | WO 01/68428 A1 | 9/2001 |

OTHER PUBLICATIONS

German-language Office Action issued in counterpart German Application No. 10 2013 012 104.3 dated Feb. 11, 2015 (Eight (8) pages).

International Preliminary Report on Patentability (PCT/IB/326 & PCT/IB/373) issued in PCT Application No. PCT/EP2014/064499 dated Jan. 21, 2016, including English translation of Written Opinion (PCT/ISA/237) (eleven (11) pages).

* cited by examiner

METHOD FOR DETERMINING AN AIR GAP OF A VEHICLE BRAKE AND VEHICLE BRAKE HAVING A DEVICE FOR DETERMINING AN AIR GAP

CROSS REFERENCE TO RELATED APPLICATIONS

This application is a continuation of PCT International Application No. PCT/EP2014/064499, filed Jul. 8, 2014, which claims priority under 35 U.S.C. § 119 from German Patent Application No. 10 2013 012 104.3, filed Jul. 12, 2013, the entire disclosures of which are herein expressly incorporated by reference.

BACKGROUND AND SUMMARY OF THE INVENTION

The invention relates to a method for determining an air gap of a vehicle brake, in particular for a motor vehicle, wherein the vehicle brake includes a clamping device, a wear adjustment device, a sensor device for detecting an operating stroke of the clamping device and a vehicle control system. The invention also relates to a vehicle brake with a device for determining an air gap.

A vehicle brake can be a disc brake or a drum brake for example. Different types of operation, for example pneumatic, hydraulic, electrical and also combinations thereof are in use. With all types an air gap, i.e. a spacing between a brake lining (pad) and a brake disc (disc brake) or a drum (drum brake) depending on the brake design, is designed within close limits. Thus an air gap between a brake lining and a brake disc for a commercial vehicle disc brake lies in a range from approx. 0.6 to 1.1 mm. The aim is to keep said target air gap, which changes because of wear and other effects, within said predetermined range in order to prevent excessive wear on the one hand and to prevent high fuel consumption on the other hand.

There are sensor devices for detecting an operating stroke of a clamping device of a vehicle brake, in order thereby to determine a current air gap. A clamping device is a brake lever for example, the pivot angle of which can be detected as an operating stroke. It is also possible for example to detect the displacement distance of a piston of a brake cylinder as the operating stroke.

Vehicle brakes, in particular for motor vehicles, are usually fitted with automatically operating mechanical wear adjustment devices. Said wear adjustment devices work very reliably and reduce an air gap that is becoming too large. They are known in different embodiments, such as for example mechanical adjusters with automatic adjustment of a friction point. With this the adjustment device is activated for every brake operation, for example by a feed element of the clamping device. In the event of wear of brake linings and brake discs in a disc brake, an automatic adjustment of the linings is carried out by means of the wear adjustment device, for example by an adjustment movement of variable length threaded tubes.

The document DE 10 2004 037 771 A1 discloses an example of an adjustment device. For this a rotary drive displacement, for example of a torque limiter, for example with a ball ramp, is passed to a feed spindle of a threaded tube by means of a continuously operating clutch (slip clutch).

DE 102010032515 A1 discloses a brake wear sensor of a disc brake. In this case, superpositioning of an adjustment displacement and an operating stroke is achieved by means of a planetary gear. The adjustment displacement is introduced to the star wheel of the planetary gear as a rotary displacement. The rotary displacement of the/an adjustment spindle is used for this for example. The operating stroke is introduced as a further rotary displacement by means of the planetary carrier of the planetary gear. The rotation of the hollow wheel of the planetary gear is detected by means of a suitable sensor, for example a Hall sensor, a potentiometer, an inductive, optical or acoustic sensor element. Thus there are deflection amplitudes on the hollow wheel resulting from the two input magnitudes of the two detected variables, and the same can be used with the sensor with a measurement range that is matched to the required resolution.

Owing to the continual efforts to reduce costs, wherein at the same time quality and usefulness should not only be maintained but increased and moreover maintenance costs are to be reduced, there is a corresponding demand for an improved method for determining an air gap of a vehicle brake.

An air gap can be changed by different disturbance effects during the running time.

Therefore, the object of the present invention is to provide an improved method for determining an air gap of a vehicle brake. Another object is to provide an improved vehicle brake.

The object is achieved by a method and also by a vehicle brake in accordance with embodiments of the invention.

A method for determining an air gap is provided that determines a time derivative of the measurement value for determining the air gap using recorded measurement values of an operating stroke.

A method according to the invention is provided for determining an air gap of a vehicle brake, in particular for a motor vehicle, wherein the vehicle brake comprises a clamping device, a wear adjustment device, a sensor device for detecting an operating stroke of the clamping device and a vehicle control system. It includes the steps of the method (S1) recording an operating stroke measurement signal that is provided by the sensor device within a previously specified time window during a braking process and storing the measurement signal as an operating stroke-time data pair during a braking process; (S2) forming a time derivative of the measurement signal in the time window with a suitable algorithm for determining a point in time at a maximum; and (S3) determining the air gap using the point in time determined in this way and passing the value of the air gap determined in this way to the vehicle control system.

In this way it is possible to provide monitoring of the air gap, wherein a display of the determined air gap can rapidly inform a driver about a deviation. Countermeasures may then be initiated, whereby subsequent large repair costs are reduced or even rendered unnecessary.

The air gap can thus be determined very accurately and robustly, i.e. without the influence of disturbance variables.

A vehicle brake according to the invention, in particular for a motor vehicle, comprises a clamping device, a wear adjustment device, a sensor device for detecting an operating stroke of the clamping device, a vehicle control system and a device for determining an air gap. The device for determining the air gap is designed for performing the method according to the invention.

It is thus possible that disadvantages, such as for example the influence of a response pressure of a pneumatic brake and stiffness of the brake, have a small to negligible influence on the determination of the air gap. Above all the stiffness of the brake undergoes large fluctuations owing to the lining wear and the lining temperature. With the vehicle brake according to the invention, sufficiently accurate assumptions regarding the stiffness and response pressure are unnecessary.

Further advantageous embodiments are disclosed herein.

In one embodiment, the operating stroke measurement signal provided by the sensor device is transferred from a monitoring unit to an analysis unit as an analog measurement signal. So that the same can take place on a very short path to reduce the effect of disturbance parameters, the monitoring unit can be integrated within the sensor device and can only comprise a short connection to an analysis unit or can be disposed together with the analysis unit.

It is provided in a further embodiment that the recording step of the method (S1) comprises the substeps:

(S1.1) determining the start of the time window from the start of a braking process initiated by a driver by operating the brake pedal; (S1.2) activation of the monitoring unit at the start of the time window by a brake control system that is located in the vehicle control system; (S1.3) transmission of the analog measurement signal to the analysis unit by the monitoring unit activated in this way; (S1.4) conversion of the transmitted analog operating stroke measurement signal into a digital measurement signal by the analysis unit and storing said digital measurement signal as an operating stroke-time data pair during a braking process; and (S1.5) continuation by the analysis unit of the substep (S1.4), conversion and storing of the measurement signal as an operating stroke-time data pair, during a braking process for the previously determined time of the time window. Easier processing is possible owing to the conversion of the analog measurement signal into a digital measurement signal. Moreover, further processing can be carried out owing to storing the measurement signal as an operating stroke-time data pair during a braking process.

It is advantageous for this if the conversion of the transmitted analog operating stroke measurement signal into a digital measurement signal in the conversion substep (S1.4) and in the continuation substep (S1.5) is carried out with a high sampling rate. With this it is also possible to use the method according to the invention with hydraulically operated vehicle brakes, which comprise so-called shorter response times. The range of applications is increased thereby.

Furthermore, it is provided that in the continuation substep (S1.5) the conversion and storage of the measurement signal as an operating stroke-time data pair during a braking process is interrupted at an end point in time of the previously determined time window if the braking process that has commenced is not yet completed. As a result, the conversion time is limited and rapid analysis is enabled.

With shorter braking processes, in the continuation substep (S1.5) the conversion and storing of the measurement signal as an operating stroke-time data pair can be interrupted during a braking process at the point in time at which the braking process that has started is terminated within the previously determined time window.

In yet another embodiment, the forming of a time derivative step (S2) of the method comprises the following substeps: (S2.1) processing the stored data of the measurement signal as an operating stroke-time data pair during a braking process by the analysis unit by smoothing and filtering the stored measurement signal data; (S2.2) forming the time derivative of the stored measurement signal data in the time window by the analysis unit with a suitable algorithm; and (S2.3) determining the point in time of the maximum of the time derivative formed in this way by the analysis unit. Owing to the time derivative, monitoring and analysis of the operating speed is possible, from which the current air gap can be determined by a simple analysis of the maximum. For this purpose, only a software computing algorithm is necessary, which makes no hardware changes or additions to the vehicle brake necessary.

In one embodiment, the determining of the air gap step (S3) of the method comprises the following substeps:

(S3.1) determining the value of the air gap using the point in time and using the stored operating stroke data from the analysis unit; (S3.2) adapting the value of the air gap determined in this way by the analysis unit for passing from the analysis unit to the vehicle control system; and (S3.3) displaying the determined and adapted value of the air gap. Because the stored operating stroke measurement signal data can thus be called up as a data pair of an operating stroke value and an associated time for a selected point in time, simple determination of the air gap is possible using the point in time of the maximum.

In another embodiment, the determined and adapted value of the air gap is transmitted from the vehicle control system to a central controller of the vehicle control system for storage and subsequent analysis. As a result, a current air gap can be displayed and timely countermeasures may be taken.

In one embodiment of the vehicle brake, the device for determining the air gap comprises the sensor device, a monitoring unit coupled to the sensor device and an analysis unit coupled to the vehicle control system. This is a compact design that does not significantly increase the installation space of the vehicle brake.

A further embodiment provides that the monitoring unit is electrically connected to a sensor of the sensor device and is designed for analog transmission of the recorded measurement signal of the sensor to the analysis unit. It is advantageous for this if the monitoring unit is integrated within the sensor device.

In an alternative, it is provided that the monitoring unit is electrically connected to a sensor of the sensor device and is designed for monitoring or analysis of the output signal of the sensor such that if the sensor is provided for two different measurement variables, the monitoring unit separates the detected operating stroke measurement variable from the other detected measurement variable and is designed for the analog transmission of the recorded and separated measurement signal of the sensor to the analysis unit. The range of applications is thus extended.

In yet another embodiment, the analysis unit is designed for conversion of the transmitted analog operating stroke measurement signal into a digital measurement signal by the analysis unit as an A/D (Analog/Digital) converter and storing said digital measurement signal in a memory device as an operating stroke-time data pair. The memory device is preferably a component of the analysis unit.

In one embodiment, it is provided that the analysis unit is designed for forming the time derivative of the stored operating stroke measurement signal data of the operating stroke-time data pair and for determining a point in time at the maximum of the time derivative that is formed. This can be implemented in software for example, wherein an additional need for space is unnecessary or negligible.

The vehicle brake can be a pneumatic disc brake.

Of course, the method according to the invention can be used not only with a pneumatically operated disc brake. Thus for example it can also be used with pneumatic drum brakes and also with hydraulic disc and drum brakes.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
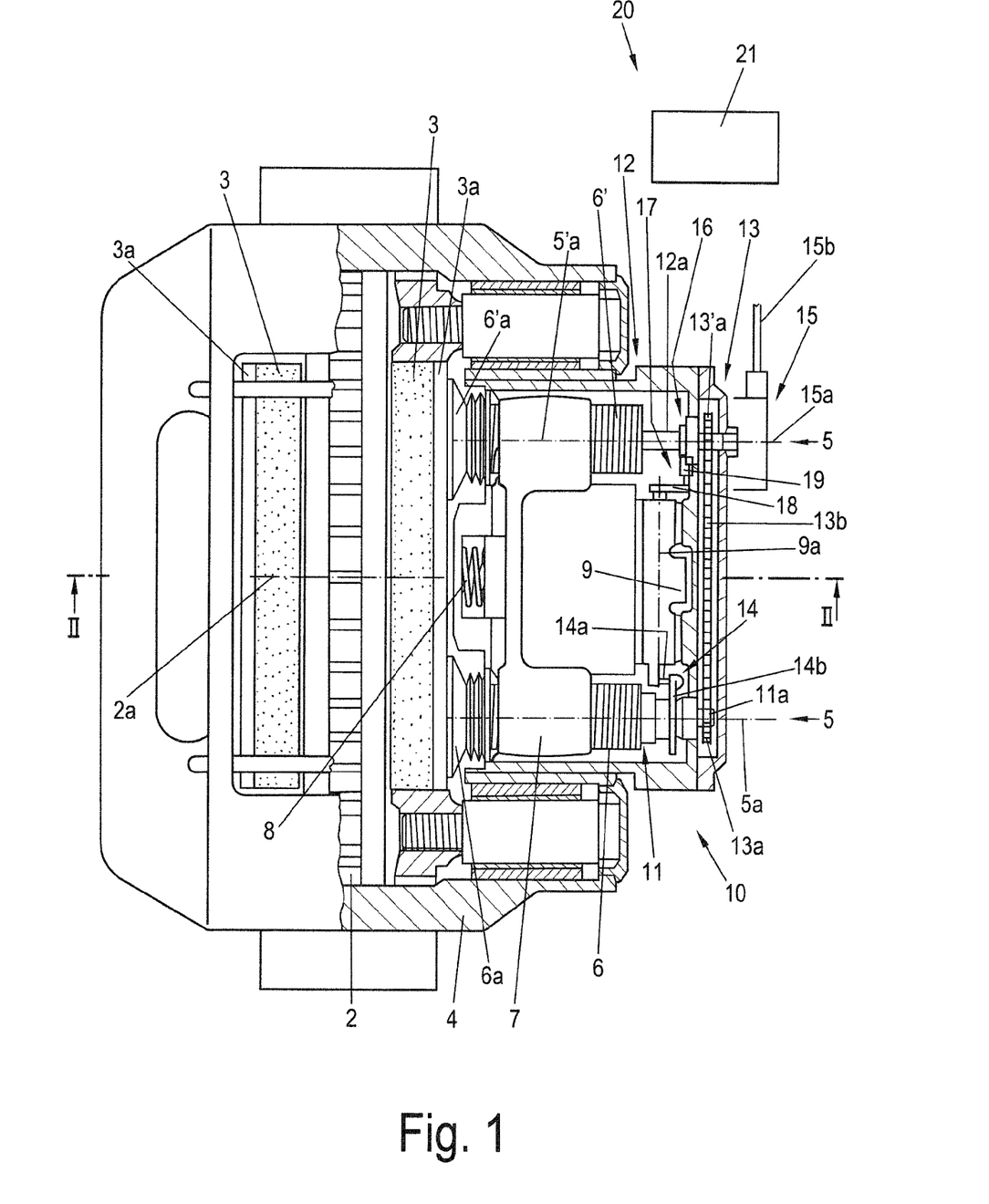
FIG. 1 shows a schematic partial sectional view of an exemplary embodiment of a vehicle brake according to the invention with a device according to the invention.
Figure 2:
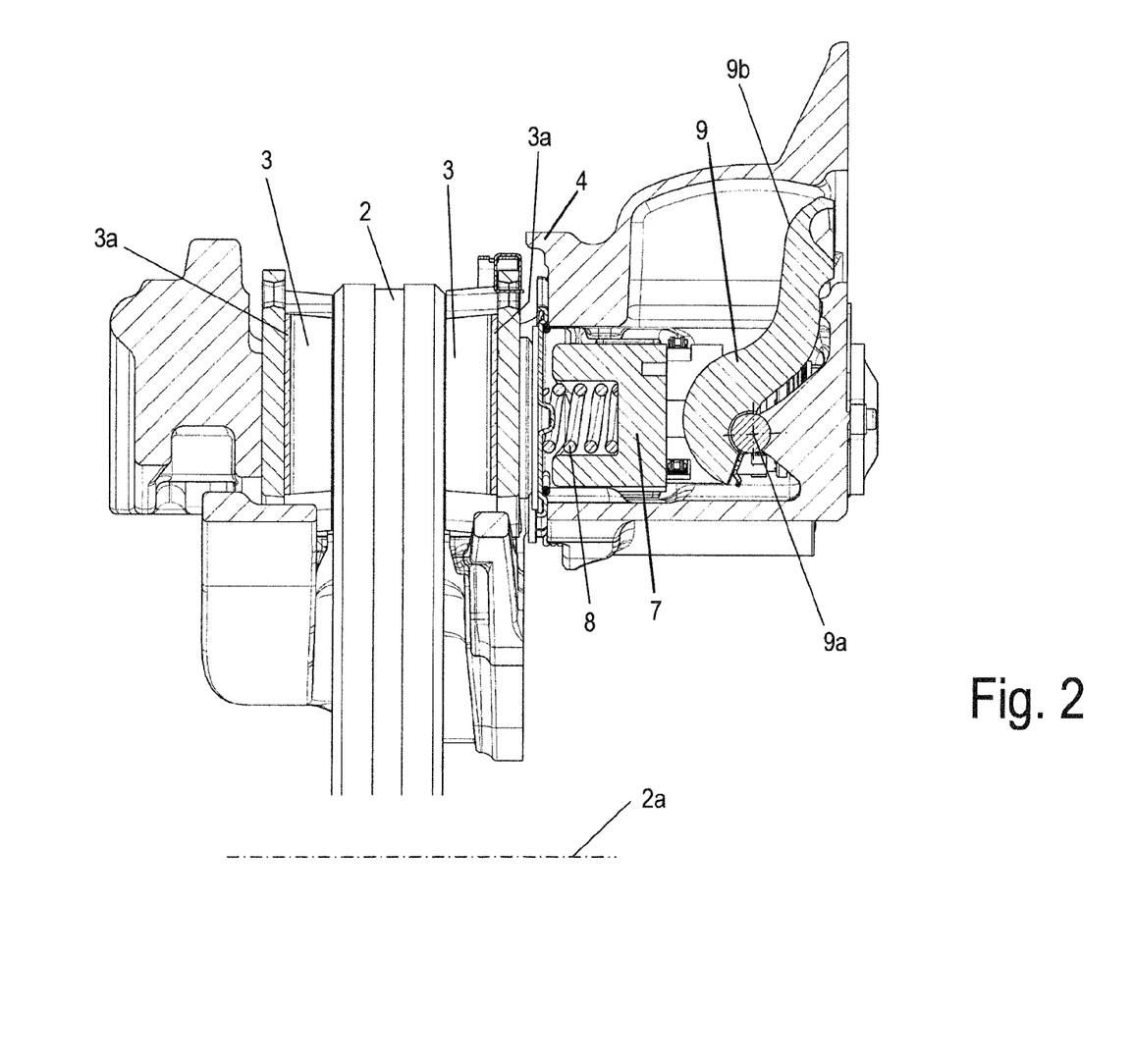
FIG. 2 shows a schematic sectional view of the exemplary embodiment along the line II-II according to FIG. 1.

In FIG. 1 a schematic perspective view of an exemplary embodiment of a vehicle brake according to the invention with a device 20 according to the invention for determining an air gap of the vehicle brake is illustrated. FIG. 2 shows a schematic sectional view of the exemplary embodiment along the line II-II according to FIG. 1.

In this example the vehicle brake is a dual pad disc brake 1 with a brake caliper 4 spanning a brake disc 2. The brake disc 2 is rotatable about a brake disc axis 2a, wherein a respective brake lining 3 is disposed on a brake lining carrier 3a on each side of the brake disc 2. Furthermore, the disc brake 1 is designed with a clamping device, which is implemented here with a rotary brake lever 9. The brake lever 9 is also referred to as a spreading mechanism, is part of the clamping device, is pivotable about a lever pivot axis 9a and comprises a lever arm 9b, which can be operated by a pneumatic brake cylinder for example.

A bridge 7 is in contact with the brake lever 9 and can be operated back and forth on the brake disc 2 in the direction of the axis of the brake disc 2a by the same during clamping and release of the disc brake 1. The bridge 7 is coupled at each end to a spindle unit 5, 5' by means of respective threaded tubes 6, 6'. Each spindle unit 5, 5' comprises an axis 5a, 5'a, wherein the axis 5a of the spindle unit 5 is referred to as an adjuster axis 5a and the axis 5'a of the spindle unit 5' as the follower axis 5'a.

The ends of the spindle units 5, 5' disposed on the left in FIG. 1, which face the brake disc 2, are each provided with a pressure piece 6, 6'a. The pressure pieces 6, 6'a are in contact with a brake lining carrier 3a of a clamping side brake lining 3 that is disposed on one side of the brake disc 2 of the disc brake 1. On the other side of the brake disc 2 a further brake lining 3 with a brake lining carrier 3a is fixed in the brake caliper 4. Said brake lining 3 is also known as the reaction side brake lining 3. The brake caliper 4 can for example be a sliding caliper.

A spacing between a brake lining 3 and the brake disc 2 is referred to as an air gap. During a braking process, upon operating the disc brake 1 the air gap is initially bridged by feeding the brake lining 3 against the brake disc 2 of the disc brake 1 by means of the bridge 7 that is operated by the brake lever 9. The air gap is increased owing to the wear of the brake linings 3 and also of the brake disc 2.

The term friction point (B1 in FIG. 3) is the point at which the brake lining 3 contacts the brake disc 2 of the disc brake 1. The friction point B1 is reached when clamping after bridging the air gap. Further clamping then effects braking by pressing the brake lining 3 onto the brake disc 2. Of course this also applies to the reaction side brake lining 3. Releasing the clamping device causes reversal of the process described above.

In the embodiment shown in FIG. 1, moreover, the disc brake 1 includes a wear adjustment device 10 that is used to adjust the brake linings 3 in the event of wear in order to restore the original air gap.

The wear adjustment device 10 has an adjustment device 11 with an adjuster shaft 11a, a follower 12 with a follower shaft 12a and a synchronous unit 13 for coupling the adjustment device 11 and the follower 12.

The adjustment device 11 is not described in detail here; it can for example be designed as disclosed in DE 10 2004 037 771 A1 and is inserted in the spindle unit 5 in the associated threaded tube 6 and coupled thereto. A longitudinal axis of the adjuster shaft 11a forms the adjuster axis 5a.

The adjustment device 11 is coupled to the follower 12 by means of the synchronous unit 13 such that a rotation of the adjuster shaft 11a and of the threaded tube 6 that is rotationally fixedly connected thereto is transferred synchronously to the follower shaft 12a and hence to the threaded tube 6' that is rotationally fixedly connected to the follower shaft 12a. In FIG. 1 the synchronous unit 13 is only represented schematically, wherein the adjuster shaft 11a is rotationally fixedly connected to a synchronous wheel 13a, in this case a chain wheel, of the synchronous unit 13. The synchronous wheel 13a is connected by means of a synchronous device 13b, in this case a chain, to a further synchronous wheel 13'a that is directly or indirectly rotationally fixedly coupled to the follower shaft 12a. Said design of the synchronous unit 13 is only to be viewed as an example, other couplings, for example of the threaded tubes 6, 6' to each other, also being possible of course.

The adjustment device 11 is driven by each feed movement of the brake lever 9, during which the brake lever 9 is rotated counterclockwise about its lever pivot axis 9a (FIG. 2). This takes place by means of an adjuster drive 14 comprising an actuator 14a fixedly connected to the brake lever 9 and an adjuster drive element 14b coupled to the adjustment device 11. The actuator 14a and the adjuster drive element 14b are engaged with each other. The actuator 14a can be in the form of a pin for example. The adjuster drive element 14b can be provided with a shifting fork that interacts with the actuator 14a for example.

If there is (still) no wear during the feed movement of the brake lever 9, then there is no transmission of a drive movement to the adjuster shaft 11a owing to an overload clutch of the adjustment device 11 for example. But if there is wear, then the drive movement is transmitted to the adjuster shaft 11a of the adjustment device 11 in order to adjust the brake lining 3, whereby the air gap is adjusted to the original value. Said drive movement of the adjuster shaft 11a is transmitted to the follower shaft 12a by the synchronous unit 13.

The device 20 for determining the air gap of the vehicle brake comprises here a sensor device 15, a monitoring unit 22 and an analysis unit 23. In the example represented in FIG. 1, the analysis unit 23 is disposed in a vehicle control system 21.

In this case the sensor device 15 is designed for detecting a first measurement variable, i.e. the wear of the brake linings 3 including the brake disc 2, and for detecting a second measurement variable, i.e. an operating stroke of the clamping device.

The detection of the first measurement variable, namely the wear, is carried out by detecting the adjustment movement of the adjuster shaft 11a or the follower shaft 12a for example. For this the sensor device 15 is provided with a sensor that is not shown, for example a Hall sensor, a potentiometer, an inductive and/or optical and/or acoustic sensor element. The sensor is coupled to the monitoring unit 22 and in this case is disposed with the same in a common housing on the brake (see also FIG. 4). A connecting line 15b is used for electrical (or even optical) connection to the vehicle control system 21 of the vehicle with which the vehicle brake is associated.

In the schematic exemplary embodiment shown in FIG. 1, a sensor axis 15a of the sensor device 15 is disposed so that the follower axis 5'a coincides with the sensor axis 15a. The sensor device 15 is coupled to the follower shaft 12a. Because the adjustment movement of the adjuster shaft 11a is transmitted to the follower shaft 12a by means of the synchronous unit 13, the adjustment movement of the follower shaft 12a can be used for detecting the wear here. The coupling of the follower shaft 12a with the sensor device 15 can take place in a different way, which will not be discussed here.

Moreover, the sensor device 15 is configured in this exemplary embodiment such that it can also detect the second measurement variable, i.e. an operating stroke of the clamping device of the disc brake 1, which is the displacement of the brake lever 9 in this case. Said two detected measurement variables are transmitted to the sensor of the sensor device 15 superimposed by means of a sensor transmission means 16, which is designed for example as a superpositioning transmission means and comprises two inputs for this purpose. For the general operation of such a sensor device 15 refer to the description in the document DE 102010032515 A1.

The operating stroke is a linear displacement (apart from the pivoting displacement of the bridge 7) and is converted into a rotary or pivoting displacement here for detection as a second measurement variable for the sensor device 15. This is carried out by means of a stroke sensor drive 17, by means of which the sensor device 15 is coupled to the brake lever 9. The stroke sensor drive 17 comprises a stroke sensor actuator 18 that is connected to the brake lever 9 and a stroke sensor drive unit 19 that is coupled to the sensor device 15, which will not be described further here.

The monitoring unit 22 is electrically connected to the sensor of the sensor device 15 and performs monitoring or analysis of the output signal of the sensor such that the first detected measurement variable (wear) and the second detected measurement variable (operating stroke) can be forwarded and analyzed separately from each other. This is described in more detail below as with the analysis unit 23.

Figure 3:
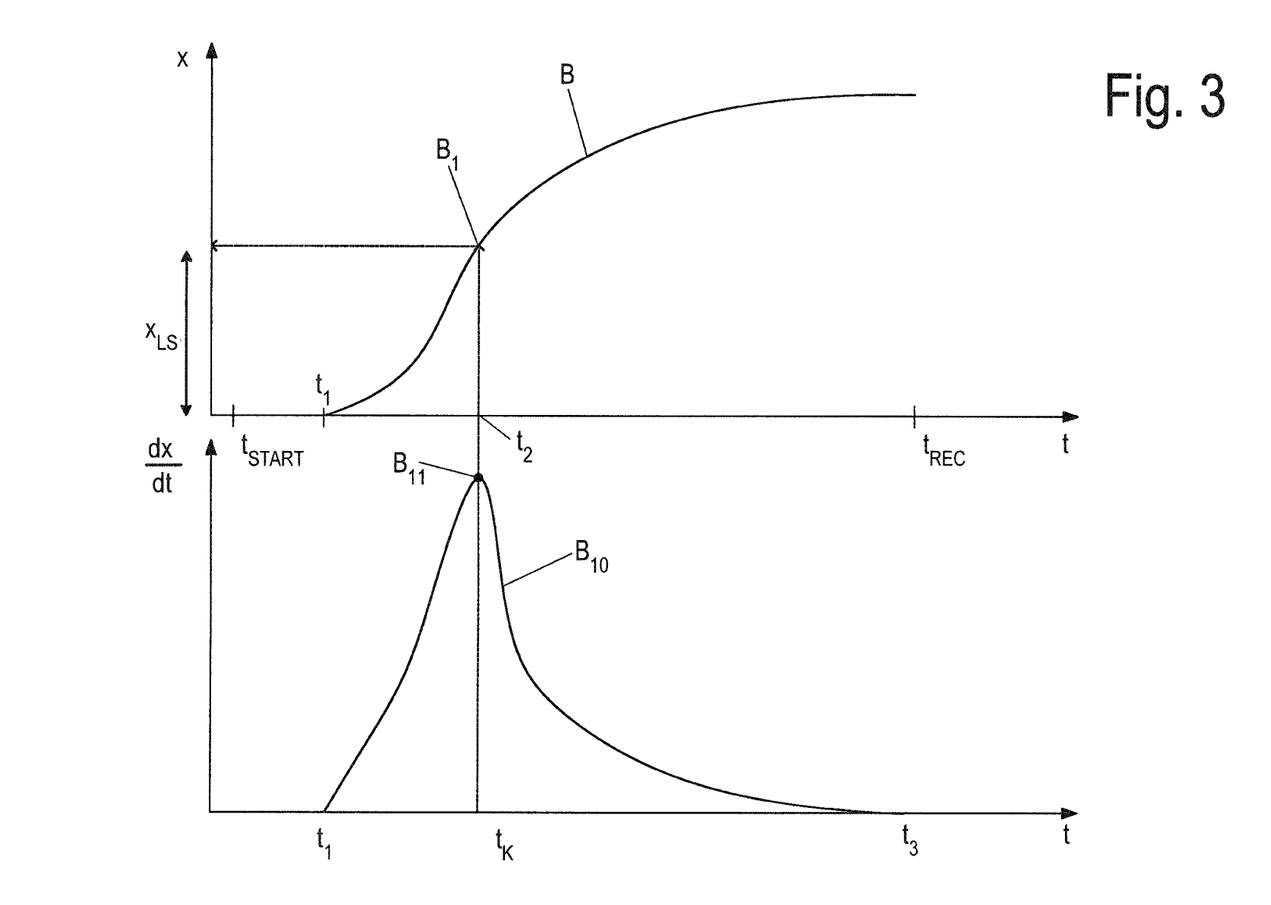
FIG. 3 shows a schematic graphical representation of an operating stroke and an operating speed.

FIG. 3 shows a schematic graphical representation of an operating stroke B and an operating speed B10.

The operating stroke B, in this case as described above a pivoting displacement of the brake lever, is plotted against the time t. In this case a displacement distance x is represented on the ordinate, wherein the air gap is provided with the designation $x_{LS}$.

The operating speed B10 is represented against the time t and coincident in time with the operating stroke B, wherein the first derivative of the displacement distance x against time t is plotted on the ordinate with the designation dx/dt.

When operating the disc brake 1, which is pneumatically operated for example, the driver operates the brake pedal, which takes place at a point in time $t_{START}$. Then a working pressure (compressed air) is set in a pressure cylinder by the vehicle control system 21. The pressure cylinder is coupled to the lever arm 9b of the brake lever 9 (see FIG. 2). A piston in the pressure cylinder converts the pressure into an (approximately) linear displacement and acts on the lever arm 9b of the brake lever 9 and further on the operating mechanism of the disc brake 1. In the exemplary embodiment shown, the brake lever 9 acts on the bridge 7 and as described above on the brake linings 3.

The operating mechanism (i.e. the bridge 7) and the piston are biased against the operating direction by means of spring elements (for example restoring spring 8 acts on the bridge 7, FIG. 1). In addition, frictional forces act on the moving parts. Until the working pressure in the pressure cylinder has overcome said bias and frictional forces, the operating mechanism will not move, i.e. the displacement distance x is zero.

The pressure level at which the operating mechanism moves from its initial position is referred to as the response pressure. This is the case at a point in time $t_1$. The operating mechanism now passes through the air gap $x_{LS}$ and presses the brake linings 3 against the brake disc 2. The pressure level at which the first brake lining 3 contacts the brake disc 2 is referred to as the contact pressure. The friction point B1 is thus reached at a point in time $t_2$ or $t_K$.

As a result of the force and mass relationships, the operating mechanism is accelerated very rapidly in the region of the air gap $x_{LS}$. This is represented by a steep gradient in the curve profile of the operating speed B10. When the first brake lining 3 contacts the brake disc 2, the operating mechanism is suddenly braked. This is the case at the friction point B1, wherein the shape of the curve of the operating speed B10 comprises a maximum B11 at this point in time $t_K$.

At a further point in time $t_3$ the displacement of the operating mechanism, i.e. the operating speed B10, has become zero. In this case the operating stroke B1 adopts a constant value a, which is the case at the point in time $t_{REC}$. The point in time $t_{REC}$ is described further below.

The device 20 according to the invention for the determination of the air gap is used to perform a method for determining the air gap using an operating stroke B and time t data pair. During this, at the point in time $t_2$ or $t_K$ at which the first brake lining 3 comes into contact with the brake disc 2, for example the first or second time derivative of the displacement distance x is determined. Said point in time $t_2$ or $t_K$ can for example be determined with a suitable algorithm using the maximum B11 of the first derivative in a known time window. With the operating stroke B-time t data pair and the point in time $t_2$ or $t_K$, it is then subsequently possible to determine the air gap $x_{LS}$. This will be described in detail below.

Figure 4:
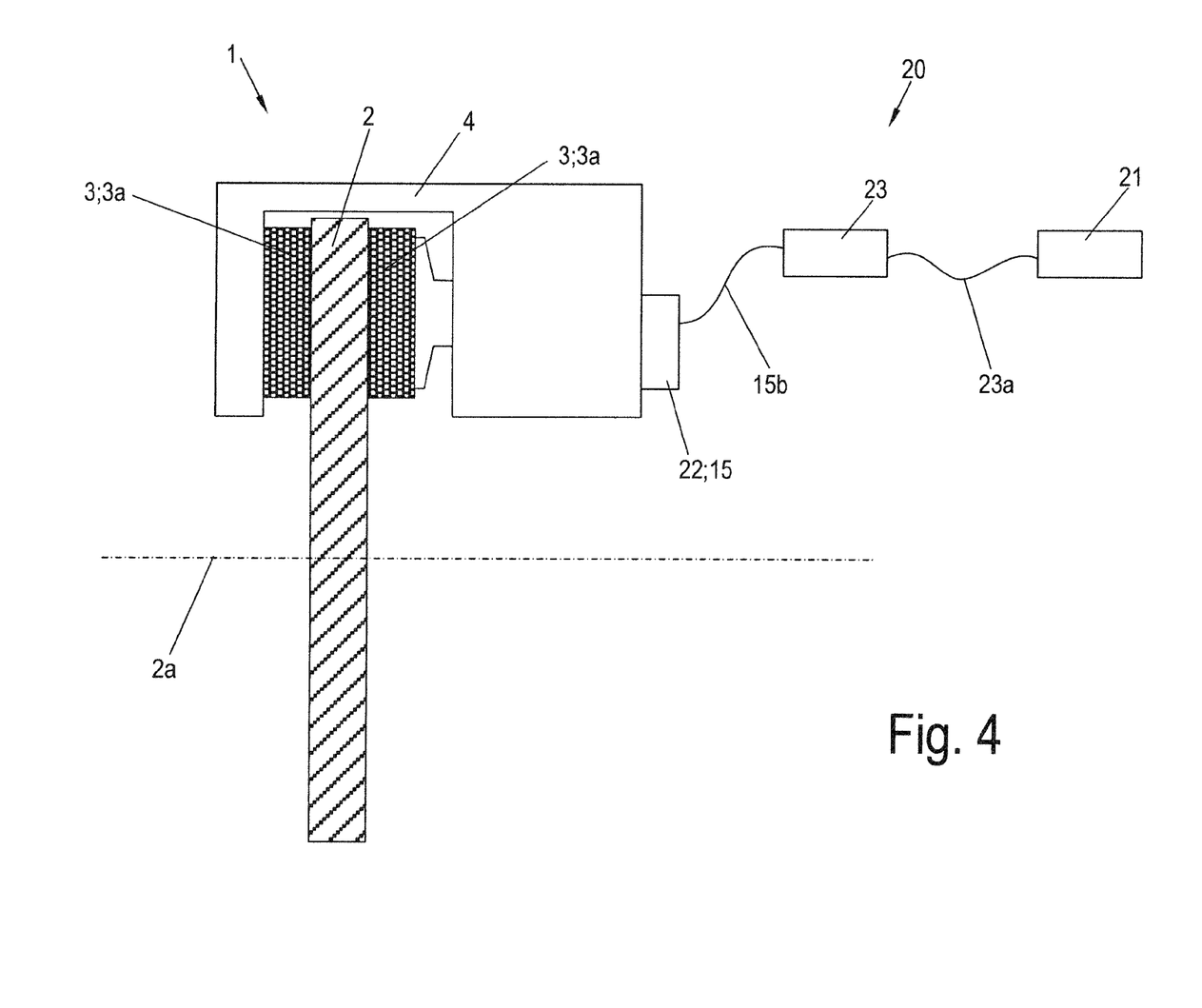
FIG. 4 shows a schematic block diagram of the vehicle brake according to the invention based on FIG. 2 with the device according to the invention.

A schematic block diagram of the vehicle brake according to the invention after FIG. 2 with the device according to the invention 20 is shown in FIG. 4.

The monitoring unit 22 of the device 20 is integrated here within the sensor device 15 on the brake caliper 4 of the disc brake 1 and is connected to the analysis unit 23 by means of connecting line 15b. The analysis unit 23 is connected to the vehicle control system 21 by means of a transmission line 23a.

It can be seen from FIG. 3 that the points in time $t_1$ of reaching the response pressure and $t_2$ or $t_K$ of reaching the contact pressure lie very close to each other. The measurement signal that the monitoring unit 22 provides from the sensor of the sensor device 15 is an analog measurement signal. Said analog measurement signal is converted into a digital measurement signal for forwarding and further processing by the analysis unit 23. Owing to the short time separation of the points in time $t_1$ and $t_2$ or $t_K$, an analog/digital conversion (A/D conversion) of the analog measurement signal with a very high frequency is necessary in order to detect the point in time $t_K$ with sufficient accuracy. To minimize the influence of the connecting line 15b (RC constant) between the monitoring unit 22 and the analysis unit 23, the path of the analog transmission should be as short as possible. Therefore, the analysis unit 23 can be disposed in the immediate vicinity of the monitoring unit 22 or can even be in the form of a component of the monitoring unit 22.

The analysis unit 23 performs an A/D conversion of the analog measurement signal of the monitoring unit 22 and transmits the measurement signal to the vehicle control system 21 in digital form by means of the transmission line 23a.

The device 20 for determining the air gap of the vehicle brake or disc brake 1 is designed for performing a method for determining the air gap.

Figure 5:
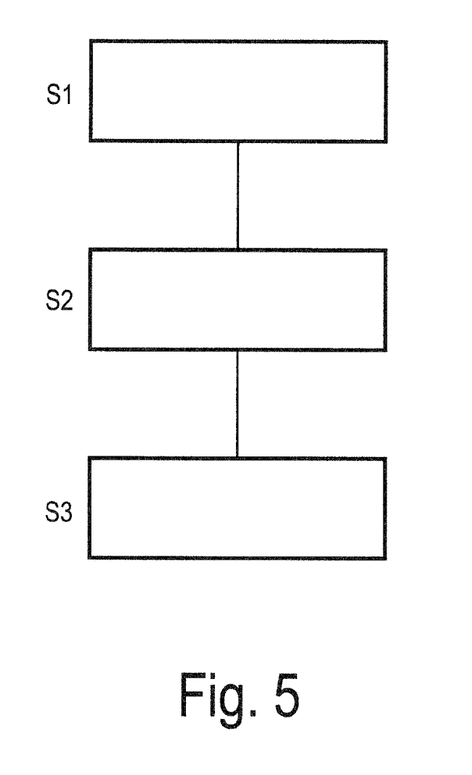
FIG. 5-6 show exemplary flow charts of a method according to the invention.
Figure 6:
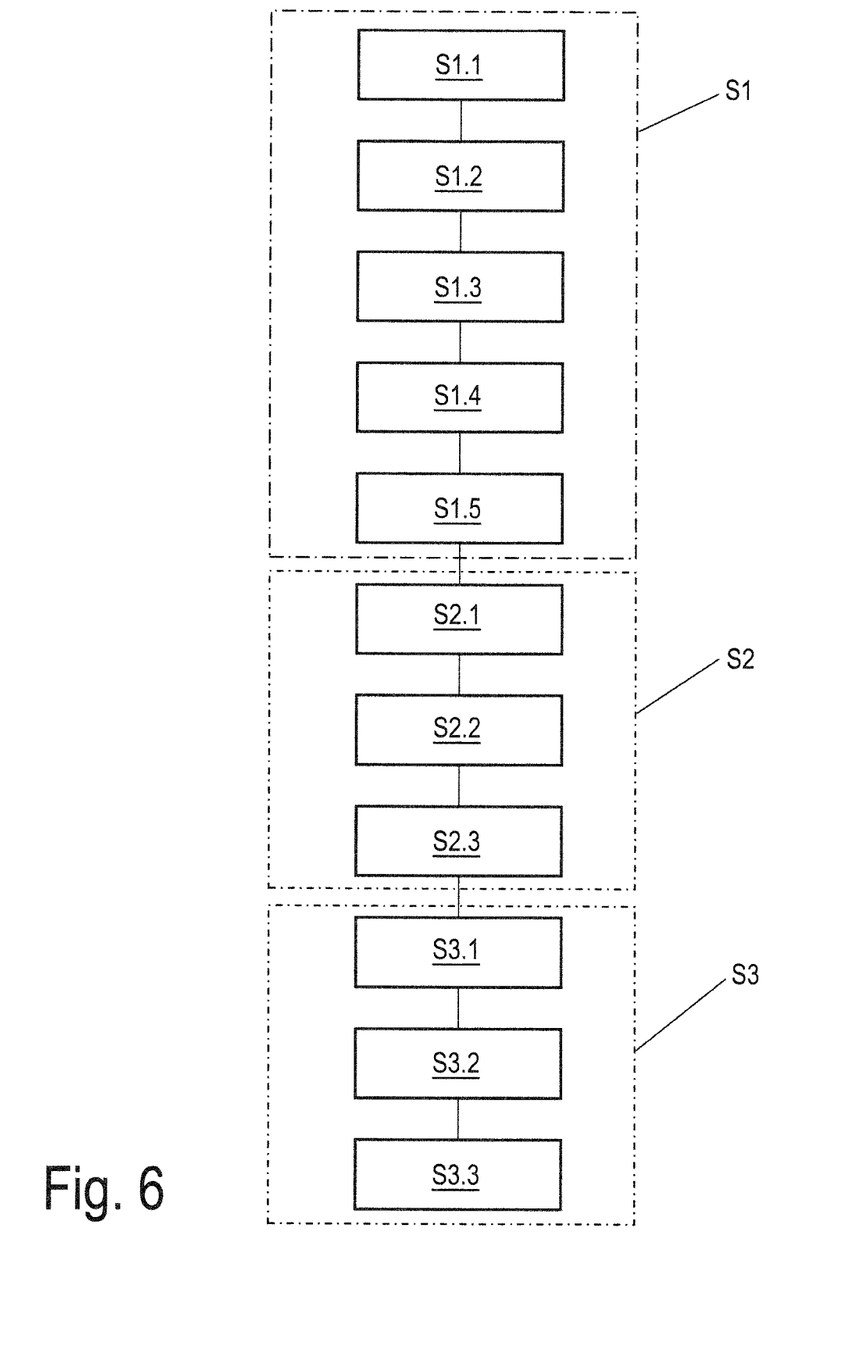

In FIGS. 5 and 6, exemplary flow charts of the method according to the invention are shown. FIG. 5 shows an exemplary flow chart in three process steps, wherein FIG. 6 shows further substeps for this.

In a first step of the method S1 (recording), the operating stroke B is recorded during a braking process in a time window $t_{START}$-$t_{REC}$ and is stored with the associated time t as an operating stroke B/time t data pair. The recording is carried out in said exemplary embodiment by means of the sensor device 15. Said recorded measurement signal of the monitoring unit 22 is then passed to the analysis unit 23 as an analog operating stroke measurement signal B of the clamping device of the disc brake 1. The analysis unit 23 converts the analog measurement signal into a digital measurement signal with a high sampling rate and stores it during this. At the end of the time window $t_{START}$-$t_{REC}$, the stored measurement signal data are provided for further processing.

The further processing of the stored measurement data is carried out in a second step of the method S2, wherein a time derivative of the measurement signal is performed by the analysis unit 23 in the time window $t_{START}$-$t_{REC}$ with a suitable algorithm for determining the point in time $t_2$ or $t_K$ at the maximum B11 (see FIG. 3).

Using the point in time $t_2$ or $t_K$ that is determined in this way, the air gap $x_{LS}$ is determined according to the recorded operating stroke (see FIG. 3) in a third step of the method S3. Said determination is also carried out in the analysis unit 23. The value of the air gap $x_{LS}$ determined in this way is then passed on to the vehicle control system 21, for example for display to the driver.

The operating stroke B can be detected by the sensor device 15 as described above. It is of course also possible that a different parameter of the vehicle brake that represents the operating stroke directly or even indirectly, for example a displacement distance of the piston of the pressure working cylinder or the bridge 7, is measured. Of course other measurement options are possible for this.

FIG. 6 shows the steps of the method S1 . . . S3 of FIG. 5 with further substeps.

Thus the step S1 of the method comprises five substeps S1.1 through S1.5.

In a first substep S1.1, during a braking process that is initiated by the driver by operating the brake pedal, said point in time is detected and determined as the point in time $t_{START}$ (see FIG. 3) for the start of the time window $t_{START}$-$t_{REC}$.

At the start of the time window $t_{START}$-$t_{REC}$, the brake control system, which is located in the vehicle control system 21 for example, energizes the monitoring unit 22 in the second substep S1.2.

The monitoring unit 22 activated in this way starts to transmit the output signal of the operating stroke B of the sensor of the sensor device 15, in this case the measurement signal, to the analysis unit 23 in the third substep S1.3.

At the same time as the energization of the monitoring unit 22, in a fourth substep S1.4 the analysis unit 23 starts the conversion of the analog operating stroke measurement signal B into a digital measurement signal with a high sampling rate and stores it in a memory device that is provided for this purpose with the associated time t as an operating stroke B/time t data pair.

In the fifth substep S1.5, the recording, conversion and storing of the measurement signal for the previously determined time of the time window $t_{START}$-$t_{REC}$ proceeds until the previously determined point in time $t_{REC}$.

If the braking process has not yet finished by said end point in time $t_{REC}$, which can be determined by checking the position of the brake pedal and the operating stroke B, i.e. for the position of the brake pedal=0 and operating stroke B=0, the further recording and storing is interrupted, and the operating stroke B/time t data pair stored up to the point in time $t_{REC}$ is provided for further processing.

If the braking process is completed within the time window $t_{START}$-$t_{REC}$, i.e. at a point in time $t_{START}$<$t_4$<-$t_{REC}$, then the recording and storing is interrupted at said point in time $t_4$, and the stored operating stroke B/time t data pair is provided for further processing.

In a first substep S2.1, the stored data pair is now processed by the analysis unit 23 by smoothing and filtering. During this, amplification of the data pair can also be carried out.

The time derivative of the measurement signal in the time window $t_{START}$-$t_{REC}$ with a suitable algorithm in a second substep S2.2 by the analysis unit 23.

Then in a third substep the point in time $t_2$ or $t_K$ at the maximum B11 is also determined by the analysis unit 23.

In a first substep S3.1 of the third step of the method S3, the value of the air gap $x_{LS}$ is determined by the analysis unit 23 using the point in time $t_2$ or $t_K$ determined in this way and using the recorded and stored operating stroke B/time t data pair of the operating stroke B (see FIG. 3). During this, the point in time $t_2$ or $t_K$ is used as the time t and the stored operating stroke B associated therewith is read out.

Adaptation of the determined value of the air gap $x_{LS}$ is then carried out in a second substep S3.2 for passing on from the analysis unit 23 to the vehicle control system 21.

In a third substep, the value of the air gap $x_{LS}$ that is determined in this way and adapted is displayed for the driver by the vehicle control system 21 and is passed in a suitable form by digital transmission by means of a bus within the vehicle, for example a CAN/B bus, to the central controller of the vehicle control system 21 for storage and subsequent analysis, for example for diagnosis and maintenance.

In this way the air gap of the vehicle brake, for example the disc brake 1 described above, can be determined accurately and robustly, i.e. without the influence of disturbance variables.

The method is suitable both for a disc brake and also for a drum brake.

The invention is not limited by the exemplary embodiment described above, but can be modified within the context of the accompanying claims.

It is contemplated that the transmission of the digital operating stroke measurement signal by means of the transmission line can also be an optical transmission.

The analysis unit 23 can also be disposed in the sensor device 15 together with the monitoring unit 22.

It is also contemplated that the analysis unit 23 is disposed in the vehicle control system 21, wherein the connecting line 15b for transmission of the analog measurement signal is designed to be particularly noise-free and impervious to irradiation. It can also be possible here that an A/D conversion of the analog measurement signal of the sensor of the sensor device 15 is disposed in the monitoring unit 22, and the analysis unit 23 already receives a digital measurement signal.

Wireless transmission of the measurement signal is also conceivable, wherein for example optical transmission is possible.

| Reference character list | |
|---|---|
| 1 | disc brake |
| 2 | brake disc |
| 2a | axis of the brake disc |
| 3 | brake lining |
| 3a | brake lining carrier |
| 4 | brake caliper |
| 5, 5' | spindle unit |
| 5a | adjuster axis |
| 5'a | follower axis |
| 6, 6' | threaded tube |
| 6a, 6'a | pressure piece |
| 7 | bridge |
| 8 | restoring spring |
| 9 | brake lever |
| 9a | lever pivot axis |
| 9b | lever arm |
| 10 | wear adjustment device |
| 11 | adjustment device |
| 11a | adjuster shaft |
| 12 | follower |
| 12a | follower shaft |
| 13 | synchronous unit |
| 13a, 13'a | synchronous wheel |
| 13b | synchronous means |
| 14 | adjuster drive |
| 14a | actuator |
| 14b | adjuster drive element |
| 15 | sensor device |
| 15a | sensor axis |
| 15b | connecting line |
| 16 | sensor transmission |
| 17 | stroke sensor drive |
| 18 | stroke sensor actuator |
| 19 | stroke sensor drive unit |
| 20 | device |
| 21 | vehicle control system |
| 22 | monitoring unit |
| 23 | analysis unit |
| 23a | transmission line |
| B | operating stroke |
| B1 | friction point |
| B10 | operating speed |
| B11 | maximum |
| S1 ... S3 | steps of the method |
| S1.1 ... 1.5, S2.1-2.3, S3.1-3.3 | substeps |
| t | time |
| x | displacement distance |
| $x_{LS}$ | air gap |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining an air gap of a vehicle brake, wherein the vehicle brake comprises a clamping device, a wear adjustment device, a sensor device for detecting an operating stroke of the clamping device and a vehicle control system, the method comprising the steps of:
   (S1) recording an operating stroke measurement signal that is provided by the sensor device within a previously specified time window beginning at a start of brake application (tSTART-tREC) and storing the measurement signal as an operating stroke-time data pair during a braking process;
   (S2) forming a time derivative of the measurement signal in the time window (tSTART-tREC) via an algorithm for determining a point in time at a maximum; and
   (S3) determining an air gap value using the determined point in time (t2 or tk) and passing the air gap value to the vehicle control system.

2. The method according to claim 1, wherein the operating stroke measurement signal provided by the sensor device is transmitted from a monitoring unit to an analysis unit as an analog measurement signal.

3. The method according to claim 2, wherein the recording step of the method comprises the substeps of:
   (S1.1) determining a start of the time window (tSTART-tREC) from the start of a braking process that is initiated by a driver by operating the brake pedal;
   (S1.2) activating the monitoring unit at the start of the time window (tSTART-tREC) by a brake control system that is located within the vehicle control system;
   (S1.3) transmitting the analog measurement signal to the analysis unit by the activated monitoring unit;
   (S1.4) converting the transmitted analog measurement signal of the operating stroke into a digital measurement signal by the analysis unit and storing said digital measurement signal as an operating stroke-time data pair; and
   (S1.5) continuing of the substep (S1.4), converting and storing the measurement signal as an operating stroke-time data pair, by the analysis unit for the previously determined time of the time window (tSTART-tREC).

4. The method according to claim 3, wherein in the converting substep (S1.4) and in the continuing substep (S1.5), the conversion of the transmitted analog operating stroke measurement signal into a digital measurement signal is carried out with a high sampling rate.

5. The method according to claim 3, wherein in the continuing substep (S1.5), the conversion and storage of the measurement signal as an operating stroke-time data pair is interrupted at an end point in time (tREC) of the previously determined time window (tSTART-tREC) if the braking process that has started has not yet finished.

6. The method according to claim 3, wherein in the continuing substep (S1.5), the conversion and storage of the measurement signal as an operating stroke-time data pair is interrupted at the point in time (t4) at which the braking process that has started within the previously determined time window (tSTART-tREC) has finished.

7. The method according to claim 3, wherein the forming the time derivative step (S2) comprises the following substeps of:
   (S2.1) processing the stored measurement signal data by the analysis unit by smoothing and filtering the stored data of the measurement signal of the operating stroke-time data pair;

(S2.2) forming the time derivative of the stored data of the measurement signal of the operating stroke-time data pair in the time window (tSTART-tREC) with a suitable algorithm by the analysis unit; and (S2.3) determining the point in time (t2 or tK) at the maximum of the time derivative formed in this way by the analysis unit.

8. The method according to claim 3, wherein the determining the air gap (xLS) step (S3) comprises the following substeps of:

(S3.1) determining the value of the air gap using the point in time (t2 or tK) and using the stored operating stroke-time data pair by the analysis unit;

(S3.2) adapting the value of the air gap determined in this way by the analysis unit for passing on from the analysis unit to the vehicle control system; and (S3.3) displaying the determined and adapted value of the air gap).

9. The method according to claim 8, wherein the determined and adapted value of the air gap is transmitted from the vehicle control system to a central controller of the vehicle control system for storage and subsequent analysis.

10. A vehicle brake for a motor vehicle, comprising:
a clamping device;
a wear adjustment device;
a sensor device for detecting an operating stroke of the clamping device;
a vehicle control system; and
a device for determining an air gap, wherein the device for determining the air gap is configured to:

(S1) record an operating stroke measurement signal that is provided by the sensor device within a previously specified time window beginning at a start of brake application (tSTART-tREC) and storing the measurement signal as an operating stroke-time data pair during a braking process;

(S2) form a time derivative of the measurement signal in the time window (tSTART-tREC) via an algorithm for determining a point in time at a maximum; and (S3) determine an air gap value using the determined point in time (t2 or tk) and passing the air gap value to the vehicle control system.

11. The vehicle brake according to claim 10, wherein the device for determining the air gap comprises the sensor device, a monitoring unit coupled to the sensor device and an analysis unit coupled to the vehicle control system.

12. The vehicle brake according to claim 11, wherein the monitoring unit is electrically connected to a sensor of the sensor device and is designed for analog transmission of the recorded measurement signal of the sensor to the analysis unit.

13. The vehicle brake according to claim 11, wherein the monitoring unit is electrically connected to a sensor of the sensor device and is designed for monitoring or analysis of the output signal of the sensor such that if the sensor is provided for two different measurement variables, the monitoring unit separates the detected operating stroke measurement variable from the other detected measurement variable and is designed for the analog transmission of the recorded and separated measurement signal of the sensor to the analysis unit.

14. The vehicle brake according to claim 11, wherein the analysis unit is designed for conversion of the transmitted analog operating stroke measurement signal by the analysis unit into a digital measurement signal as an analog/digital converter and for storing said digital measurement signal in a memory device in the form of operating stroke-time data pairs.

15. The vehicle brake according to claim 14, wherein the analysis unit is designed for forming the time derivative of the stored operating stroke measurement signal data of the operating stroke-time data pair and for determining a point in time (t2 or tK) of the maximum of the time derivative that was formed.

16. The vehicle brake according to claim 11, wherein the vehicle brake is a pneumatically operated disc brake.

* * * * *